United States Patent
Snyder et al.

(10) Patent No.: US 10,643,237 B2
(45) Date of Patent: *May 5, 2020

(54) LANDING PAGE SELECTION FOR LINKED ADVERTISING

(71) Applicant: Amazon Technologies, Inc., Reno, NV (US)

(72) Inventors: Luke A Snyder, Seattle, WA (US); Lucas P Hansen, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 330 days.

This patent is subject to a terminal disclaimer.

(21) Appl. No.: 15/152,389

(22) Filed: May 11, 2016

(65) Prior Publication Data
US 2016/0253704 A1    Sep. 1, 2016

Related U.S. Application Data

(63) Continuation of application No. 12/204,650, filed on Sep. 4, 2008, now Pat. No. 9,390,180.

(51) Int. Cl.
*G06Q 30/02* (2012.01)
*G06F 16/958* (2019.01)
*G06F 16/9535* (2019.01)
*G06F 16/2457* (2019.01)

(52) U.S. Cl.
CPC ... *G06Q 30/0256* (2013.01); *G06F 16/24578* (2019.01); *G06F 16/958* (2019.01); *G06F 16/9535* (2019.01); *G06Q 30/0277* (2013.01)

(58) Field of Classification Search
CPC ............. G06F 17/30867; G06F 16/958; G06F 16/9535; G06Q 30/02
USPC .......................................................... 707/748
See application file for complete search history.

(56) References Cited

U.S. PATENT DOCUMENTS

| | | | |
|---|---|---|---|
| 6,144,991 | A | 11/2000 | England |
| 6,339,842 | B1 | 1/2002 | Fernandez et al. |
| 6,466,918 | B1 | 10/2002 | Spiegel |
| 6,489,968 | B1 | 12/2002 | Ortega |

(Continued)

OTHER PUBLICATIONS

U.S. Non-Final Office Action dated Mar. 24, 2011 issued in U.S. Appl. No. 12/204,636.

(Continued)

*Primary Examiner* — Kimberly L Wilson
(74) *Attorney, Agent, or Firm* — Hogan Lovells US LLP

(57) ABSTRACT

A tiered approach to selecting landing pages to be associated with specific keywords allows optimal landing pages to be determined dynamically and updated continually. Suggestions for landing pages can come from a number of sources based upon any of a number of factors. A scalable set of algorithms can be used to analyze these suggestions based upon factors including those used for determining the suggestions. Each algorithm can generate a decision as to an optimal landing page to be associated with each keyword. A subsequent algorithm can analyze each decision as these decisions relate to at least one goal, and can select an optimal landing page based thereon. A sponsored link or other element can be associated with the keyword such that a user submitting a request containing the keyword can be presented with the sponsored link to the optimal landing page.

20 Claims, 5 Drawing Sheets

(56) References Cited

U.S. PATENT DOCUMENTS

| | | |
|---|---|---|
| 7,039,631 B1 | 5/2006 | Finger, II |
| 7,523,087 B1 | 4/2009 | Agarwal et al. |
| 7,668,832 B2 | 2/2010 | Yeh et al. |
| 7,680,796 B2 | 3/2010 | Yeh et al. |
| 7,716,161 B2 | 5/2010 | Dean et al. |
| 7,788,159 B1 | 8/2010 | Sack |
| 7,831,456 B2 | 11/2010 | Demir et al. |
| 7,865,397 B2 | 1/2011 | Makeev |
| 8,117,216 B1 | 2/2012 | Chandra et al. |
| 8,301,649 B1 | 10/2012 | Hansen |
| 8,719,081 B1 | 5/2014 | Langrock et al. |
| 8,719,082 B1 | 5/2014 | Snyder et al. |
| 8,719,092 B2 | 5/2014 | Gabai et al. |
| 8,832,129 B1 | 9/2014 | Hansen |
| 9,390,180 B1 | 7/2016 | Snyder et al. |
| 9,430,785 B2 | 8/2016 | Hansen |
| 2003/0050916 A1 | 3/2003 | Ortega et al. |
| 2003/0055817 A1 | 3/2003 | Paine et al. |
| 2004/0054551 A1 | 3/2004 | Ausubel |
| 2004/0107137 A1 | 6/2004 | Skinner |
| 2005/0050027 A1 | 3/2005 | Yeh et al. |
| 2005/0050097 A1 | 3/2005 | Yeh et al. |
| 2005/0076014 A1 | 4/2005 | Agarwal et al. |
| 2005/0137939 A1 | 6/2005 | Calabria et al. |
| 2005/0222901 A1 | 10/2005 | Agarwal et al. |
| 2005/0251444 A1 | 11/2005 | Varian et al. |
| 2006/0036583 A1 | 2/2006 | Sondergaard et al. |
| 2006/0122889 A1 | 6/2006 | Burdick et al. |
| 2006/0190354 A1 | 8/2006 | Meisel |
| 2006/0212350 A1 | 9/2006 | Ellis et al. |
| 2006/0242012 A1 | 10/2006 | Agarwal et al. |
| 2006/0282328 A1 | 12/2006 | Gerace |
| 2006/0288023 A1 | 12/2006 | Szabo |
| 2007/0050389 A1 | 3/2007 | Kim et al. |
| 2007/0078708 A1 | 4/2007 | Yu et al. |
| 2007/0078709 A1 | 4/2007 | Rajaram |
| 2007/0157228 A1 | 7/2007 | Bayer et al. |
| 2007/0179832 A1 | 8/2007 | Reich |
| 2007/0192794 A1 | 8/2007 | Curtis et al. |
| 2007/0233556 A1 | 10/2007 | Koningstein |
| 2007/0288454 A1 | 12/2007 | Bolivar et al. |
| 2008/0024408 A1 | 1/2008 | Sano et al. |
| 2008/0033810 A1* | 2/2008 | Chu ................. G06Q 30/02 705/14.54 |
| 2008/0046312 A1* | 2/2008 | Shany ................. G06Q 30/02 705/14.26 |
| 2008/0082655 A1 | 4/2008 | Goswami |
| 2008/0114671 A1 | 5/2008 | Goel et al. |
| 2008/0189177 A1 | 8/2008 | Anderton |
| 2008/0243797 A1 | 10/2008 | Song et al. |
| 2008/0249991 A1 | 10/2008 | Valz |
| 2008/0255921 A1 | 10/2008 | Flake |
| 2008/0275757 A1 | 11/2008 | Sharma et al. |
| 2008/0288328 A1 | 11/2008 | Minor et al. |
| 2008/0294524 A1 | 11/2008 | Badros et al. |
| 2009/0106096 A1 | 4/2009 | Horowitz |
| 2009/0112653 A1 | 4/2009 | Chang |
| 2009/0254414 A1 | 10/2009 | Schwarz et al. |
| 2009/0265218 A1 | 10/2009 | Amini |
| 2009/0299831 A1 | 12/2009 | Li et al. |
| 2010/0005001 A1 | 1/2010 | Aizen et al. |
| 2010/0023311 A1 | 1/2010 | Subrahmanian et al. |
| 2010/0094706 A1 | 4/2010 | Gabai et al. |
| 2010/0131350 A1 | 5/2010 | Yeh et al. |
| 2010/0223261 A1 | 9/2010 | Sarkar |
| 2014/0304088 A1 | 10/2014 | Snyder |
| 2014/0379498 A1 | 12/2014 | Hansen |

OTHER PUBLICATIONS

U.S. Final Office Action dated Aug. 18, 2011 issued in U.S. Appl. No. 12/204,636.
U.S. Non-Final Office Action dated Jan. 18, 2012 issued in U.S. Appl. No. 12/204,636.
U.S. Final Office Action dated Jun. 12, 2012 issued in U.S. Appl. No. 12/204,636.
U.S. Non-Final Office Action dated Dec. 24, 2013 issued in U.S. Appl. No. 12/204,636.
U.S. Final Office Action dated Sep. 24, 2014 issued in U.S. Appl. No. 12/204,636.
U.S. Final Office Action dated Feb. 20, 2015 issued in U.S. Appl. No. 12/204,636.
U.S. Final Office Action dated Jan. 21, 2016 issued in U.S. Appl. No. 12/204,636.
U.S. Non-Final Office Action dated May 18, 2011 issued in U.S. Appl. No. 12/204,650.
U.S. Final Office Action dated Oct. 12, 2011 issued in U.S. Appl. No. 12/204,650.
U.S. Non-Final Office Action dated Sep. 11, 2014 issued in U.S. Appl. No. 12/204,650.
U.S. Final Office Action dated May 21, 2015 issued in U.S. Appl. No. 12/204,650.
U.S. Notice of Allowance dated Mar. 16, 2016 issued in U.S. Appl. No. 12/204,650.
U.S. Non-Final Office Action dated Sep. 15, 2011 issued in U.S. Appl. No. 12/204,663.
U.S. Notice of Allowance dated Jul. 3, 2012 issued in U.S. Appl. No. 12/204,663.
U.S. Non-Final Office Action dated Dec. 24, 2013 issued in U.S. Appl. No. 13/621,080.
U.S. Notice of Allowance dated May 22, 2014 issued in U.S. Appl. No. 13/621,080.
U.S. Non-Final Office Action dated Apr. 27, 2011 issued in U.S. Appl. No. 12/204,680.
U.S. Final Office Action dated Aug. 18, 2011 issued in U.S. Appl. No. 12/204,680.
U.S. Non-Final Office Action dated Aug. 16, 2013 issued in U.S. Appl. No. 12/204,680.
U.S. Final Office Action dated Nov. 3, 2014 issued in U.S. Appl. No. 12/204,680.
U.S. Final Office Action dated Apr. 25, 2014 issued in U.S. Appl. No. 12/204,680.
U.S. Non-Final Office Action dated Jan. 6, 2016 issued in U.S. Appl. No. 12/204,680.
U.S. Non-Final Office Action dated Apr. 17, 2015 issued in U.S. Appl. No. 14/480,517.
U.S. Final Office Action dated Oct. 29, 2015 issued in U.S. Appl. No. 14/480,517.
U.S. Notice of Allowance dated Apr. 29, 2016 issued in U.S. Appl. No. 14/480,517.
U.S. Non-Final Office Action dated Feb. 15, 2011 issued in U.S. Appl. No. 12/267,833.
U.S. Final Office Action dated Aug. 2, 2011 issued in U.S. Appl. No. 12/267,833.
U.S. Notice of Allowance dated Jan. 10, 2014 issued in U.S. Appl. No. 12/267,833.
U.S. Non-Final Office Action dated Sep. 18, 2012 issued in U.S. Appl. No. 12/308,924.
U.S. Final Office Action dated Aug. 21, 2013 issued in U.S. Appl. No. 12/308,924.
U.S. Notice of Allowance dated Dec. 24, 2013 issued in U.S. Appl. No. 12/308,924.
U.S. Non-Final Office Action dated Nov. 10, 2014 issued in U.S. Appl. No. 14/228,025.
U.S. Non-Final Office Action dated Jun. 2, 2015 issued in U.S. Appl. No. 14/228,025.
U.S. Final Office Action dated Dec. 23, 2015 issued in U.S. Appl. No. 14/228,025.
U.S. Non-Final Office Action dated Feb. 25, 2016 issued in U.S. Appl. No. 14/228,025.
Fong, et al. "Online Analytical Mining of Path Traversal Patterns for Web Measurement" Oct. 2002, Idea Group, Inc. vol. 13, Issue 4, pp. 39-61.
U.S. Non-Final Office Action dated Oct. 3, 2016 issued in U.S. Appl. No. 14/228,025 (U.S. Appl. No. 14/228,025).
U.S. Non-Final Office Action dated Jun. 28, 2017 issued in U.S. Appl. No. 14/228,025 (U.S. Appl. No. 14/228,025).

(56) References Cited

OTHER PUBLICATIONS

U.S. Final Office Action dated Nov. 29, 2017 issued in U.S. Appl. No. 14/228,025 (U.S. Appl. No. 14/228,025).
Non-Final Office Action issued in related U.S. Appl. No. 12/267,870 dated Feb. 17, 2011.
Final Office Action issued in related U.S. Appl. No. 12/267,870 dated Jul. 28, 2011.
Notice of Allowance issued in related U.S. Appl. No. 12/267,870 dated Dec. 31, 2013.

* cited by examiner

LANDING PAGE SELECTION FOR LINKED ADVERTISING

CROSS-REFERENCES TO RELATED APPLICATIONS

This application is a continuation of allowed U.S. application Ser. No. 12/204,650, entitled "Landing Page Selection for Linked Advertising," filed Sep. 4, 2008, the full disclosure of which is incorporated herein by reference in its entirety.

BACKGROUND

As the number of users viewing information and purchasing items electronically increases, there is a corresponding increase in the amount of advertising revenue spent in electronic environments. In some cases, advertisements are specifically selected for certain pages or other interfaces displayed to a user. In other cases, these advertisements are selected based on content that can be displayed in any of a number of different pages. For example, a user might search for information about a keyword through a search engine. When a results page is returned to the user that includes search results relating to that keyword, at least one advertisement can be included with the results page that relates to the keyword and/or search results. Often, the advertisement includes a hypertext link or other user-selectable element that enables the user to navigate to another page or display relating to the advertisement.

The selection of the link to include with the advertisement, and thus the page to which the user may navigate (hereinafter referred to as the "landing page"), should be determined such that the user viewing the advertisement on the search results page not only will be interested in following the link, but in the case of advertising an item, also will be likely to buy or otherwise consume the advertised item. In past systems, certain landing pages were selected for specific categories that included a number of keywords, such that whenever one of those keywords was submitted by a user the advertisement for a general category would be shown, which might not be very relevant to the actual keyword that was submitted. In some systems, a number of landing pages might be suggested for a keyword or category, and the landing page would be selected based upon a rating or identity of the source for each landing page. For example, in an electronic marketplace there might be several sellers, departments, etc., offering items in a given category, each of which might suggest a landing page for that category. Each source could submit a keyword-landing page pair, for example, wherein the source suggests that a particular landing page be used when advertising for that keyword. Such an approach does not take into account various factors that can increase revenue, conversions, etc., or otherwise result in a dynamic selection of an optimal landing page to display to a user.

Further, in many cases there will be multiple advertisers bidding or otherwise attempting to have their advertisement(s) displayed for a given keyword. If an entity such as a search engine provider takes into account advertiser ratings based upon factors such as the appropriateness of the landing page to the keyword, then more careful attention should be paid to the landing page suggested for each keyword. For electronic marketplaces or other large advertisers where there may be millions of keywords, manually tracking and continually optimizing each keyword-landing page pair is impractical. Further, previous static approaches are not flexible enough to adjust the landing pages as needed based on a variety of criteria to continually provide an optimal landing page for various keywords.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to selecting landing pages for sponsored links or sponsored ads to be advertised for specific keywords or other content in an electronic environment. As known in the art, "sponsored links" or "sponsored ads" are typically used with electronic interfaces such as Web sites, search engines, applications, etc., wherein an advertiser provides a navigational element such as a hypertext link and associated text and/or graphics to be displayed in the electronic interface, and that enable a user to select or otherwise access the navigational element to be directed to a page or other location provided by the advertiser. The advertiser typically will pay a provider of the electronic interface based upon an aspect of each sponsored ad, such as the number of times users select the navigational element included therein.

Systems and methods in accordance with various embodiments provide an automated solution to the problem of selecting an optimal page (hereinafter referred to as a "landing page") to which to direct the user when selecting a navigational element for such a sponsored ad. In an example where the advertiser wants to advertise for a given advertising keyword, such as may be submitted by a user through a search engine, different pages may be selected to be optimal landing pages for different reasons at different times. For example, one system operator (or customer, etc.) may want advertisements optimized for revenue, while another operator may want to optimize for profit, and another operator may simply want the most visibility. In each case, a different landing page might be considered to be optimal for the same keyword. Such systems can include a scalable set of algorithms and data sources that can be analyzed continually, periodically, or at other appropriate times to adjust the optimal landing page associated with a keyword or other content as desired.

Figure 1:
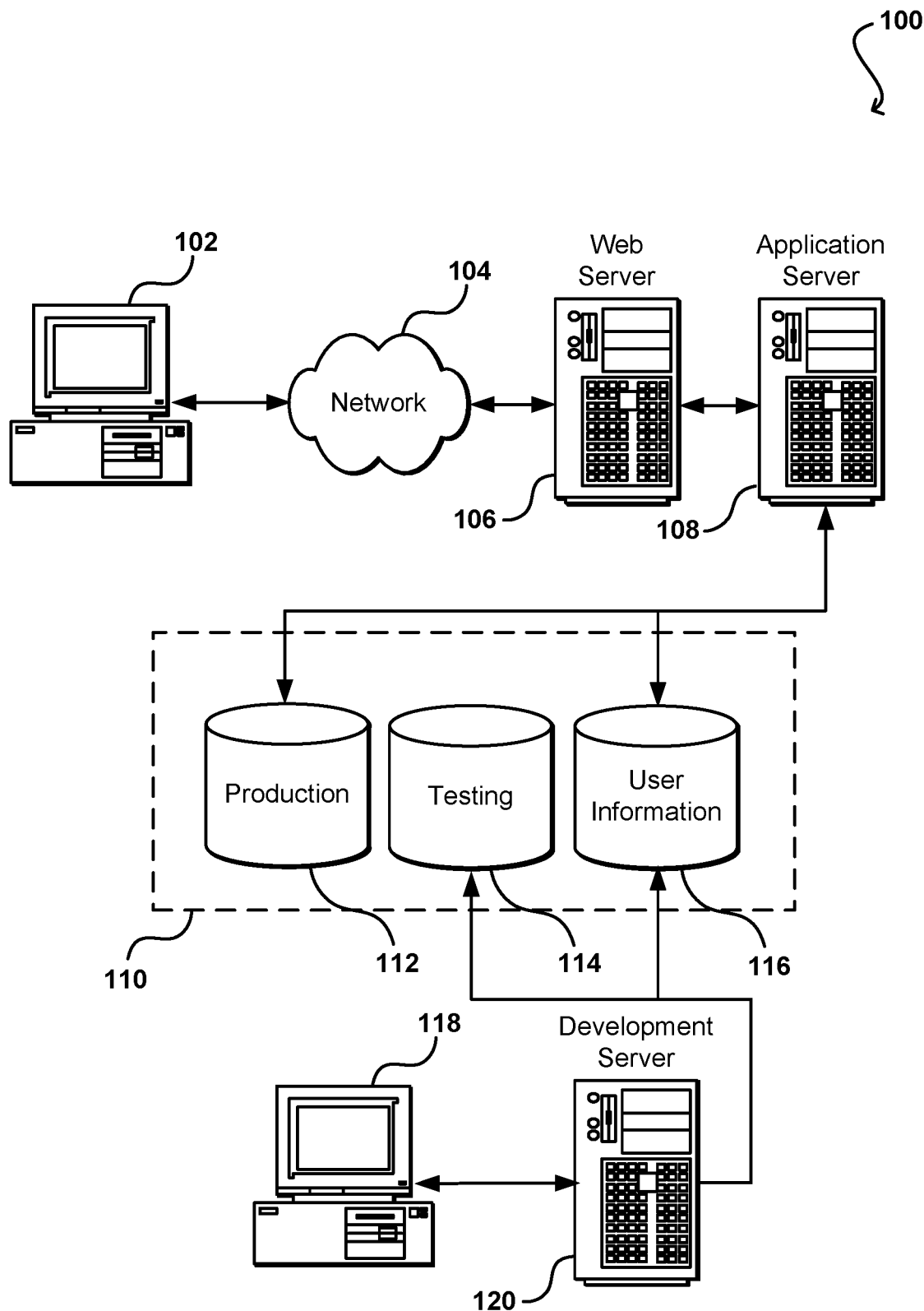
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
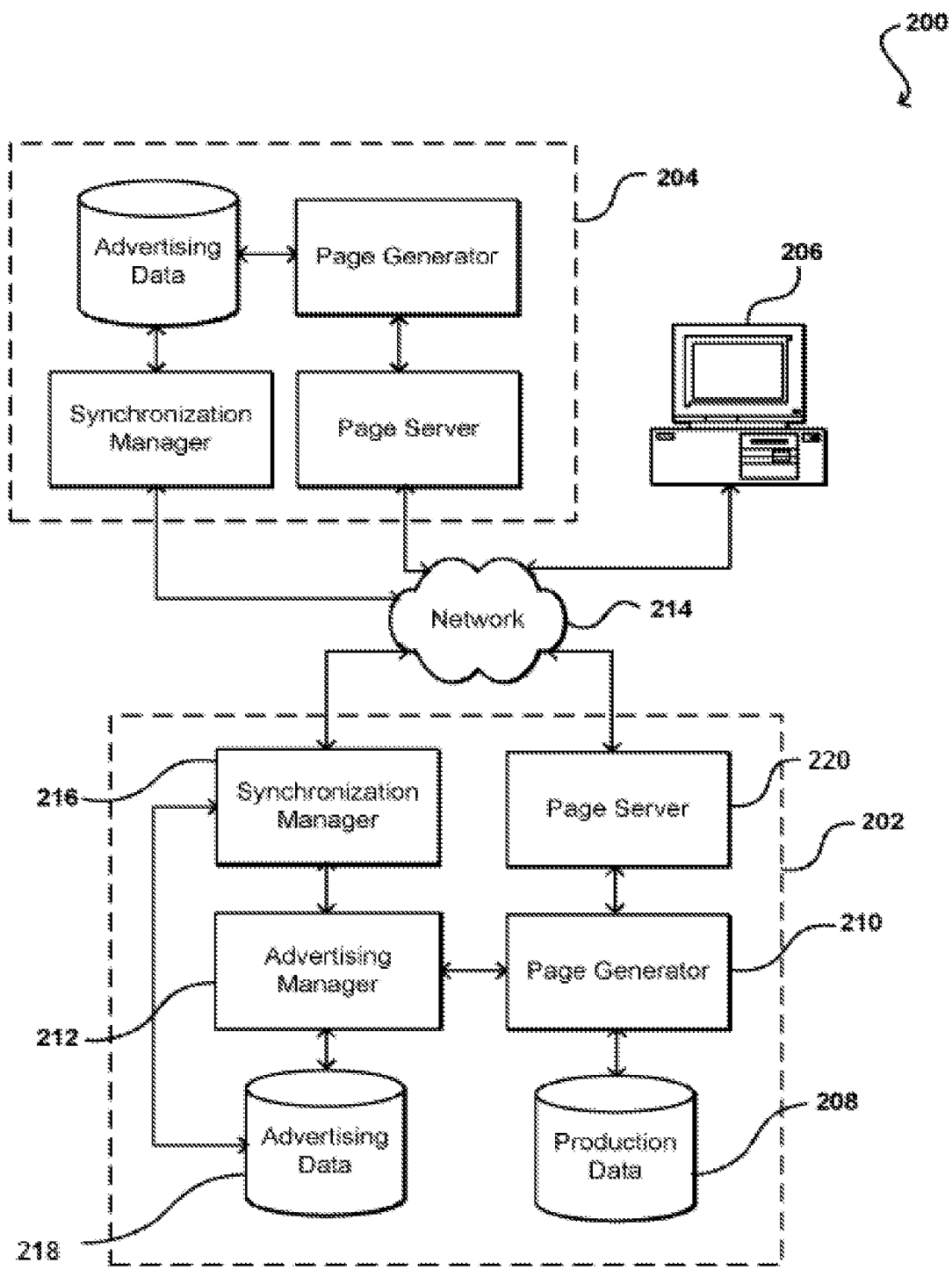
FIG. 2 illustrates components for generating keyword-landing page pairs and synchronizing those pairs with a separate provider that can be used in accordance with one embodiment.

An environment such as that illustrated in FIG. 1 can be useful for a provider such as an electronic marketplace, wherein multiple associates or other content providers might wish to advertise on pages for the marketplace itself. As discussed above, however, sometimes a provider such as an electronic marketplace might wish to advertise on other sites or with other providers. The electronic environment in such a case might include additional components and/or other arrangements, such as those illustrated in the configuration 200 of FIG. 2. In this example, components for an advertising entity 202 can generate advertising associations such as keyword-landing page pairs to be submitted to components for another provider 204. It should be understood that while keyword-landing page pairs are used for purposes of explanation, any association of a navigational process with content in an electronic environment can be used with, and benefit from, selections and other processes described with respect to various embodiments.

In this example, the advertising entity generates and serves pages of content available to any appropriate end user 206, and thus can include components such as a production data store 208 that can be used by a page generator 210 to generate pages that can be served by a page server 220 (such as a Web server in a Web-based environment) over a network 214 to the end user 206. Similarly, any other appropriate provider 204 can include page generator and page server components for generating and serving pages of content to a user. While many of the embodiments are described with respect to a Web-based environment, it should be understood that pages are not limited to Web pages, but can include any application page or other interface page that can be displayed or otherwise conveyed to a user.

If the advertising entity 202 wishes to advertise with the provider 204 using sponsored links or other advertisements that direct a user back to a page provided by the advertising entity, then the advertising entity also can include components for determining the landing pages to be associated with the advertisements. While the advertising components in this example are shown to be part of the advertiser's system, it should be understood that these components can be part of a separate system or provided as a third party service, for example. In this example, the advertising entity system includes an advertising manager 212, which as discussed elsewhere herein can encompass, monitor, and/or control a number of different algorithms and components for selecting and deciding upon landing pages. When the advertising manager 212 decides on a landing page to be associated with content on the provider pages, the advertising manager 212 can store the advertising data to an advertising data store 218, which in some embodiments can comprise separate tables in the production data store 208. The advertising entity's system also can include a synchronization manager 216 that can work with a synchronization component of the provider 204 to periodically synchronize the advertising data with the advertising data stored at the provider 204, such that the appropriate landing pages can be designated and updated as desired. When a user 206 views a page of content served by the provider 204, the page can include an advertisement that will direct the user to a page of the advertising entity 202 upon selection by the user.

As discussed above, the advertisement can include at least one sponsored link, such as a hypertext links displayed on a Web page, for example. Sponsored links also can be displayed on any appropriate interface capable of following a link or similar navigational element to another source of information, and as such the term "link" will be used for purposes of explanation but should not be interpreted as limiting the types of navigational elements that can be used with various embodiments.

As discussed, sponsored links in one example are displayed when a user searches for information in a search engine, and receives a list of search results (referred to herein as a "results page"). There are many aspects to deciding which links are displayed on a results page. For example, advertisers would like to display ads that are relevant to the content of the search results, which might be of interest to the user. For example, a user searching for information on automobiles can, on average, be more likely to purchase a book on automotive repair than a set of steak knives. Thus, the advertiser would prefer to spend the advertising money with respect to those keywords or categories which are "relevant" to the item (e.g., any product or service that can be consumed) being advertised. Further, a category can have many subcategories, and an advertiser might not decide that the advertiser wants to spend money to advertise for an "automotive" category, but would rather advertise for an "automotive books" sub-category.

Once an advertiser decides which keywords, categories, or other aspects for which to advertise, such as by using the advertising manager 212, the advertiser also has to decide how much the advertiser is willing to spend for that advertisement. In many major search engines, there can be several advertisers wishing to advertise for a given keyword or category, for example, and at least some of those advertisers are willing to pay a premium for being the most prominently featured advertisement displayed for a given keyword. In some cases only one advertisement with a link will be displayed, while in other cases there can be a list or set of ads displayed, and an advertiser might pay extra to be displayed closer to the top of a results page, etc. Many search engine and other such providers then allow these advertisers to bid for ad space, with the winning bid being displayed most prominently, and lower bids being displayed less prominently, if at all. An advertiser must then not only decide how much to bid for an advertisement based on projected conversions or revenue for each advertisement, but also must consider the placement of the advertisement on the result page and how much extra the advertiser is willing to pay to be featured more prominently. For example, an advertiser bidding $0.03 per advertisement (e.g., based on number of displayed links or number of followed links, for example) that is being featured third in a list of advertisers might be willing to adjust the bid price to $0.10 per advertisement to instead be featured at the top of the list. While this obviously can cost the advertiser more advertising revenue, the number of extra users following the top link might more than make up for the additional cost. Further, an advertiser might make significantly more money from an advertisement at certain times of the day, week, year, etc., and thus might be willing to spend differently at different times. An advertising manager 212 thus may also be configured to analyze revenue, conversion rates, historical data, and other information that can be stored with the advertising data store 218 in order to determine an appropriate price to bid for each ad Various other aspects also can be taken into consideration. For example, if an advertiser spends a significant amount of money to be featured with a keyword or category, the advertiser would like to display information in addition to the sponsored link that is successful in getting users to want to follow the link. For example, an advertiser could display a generic message with each advertisement, such as the name and slogan of the advertiser, but that message might in general be less effective than a message tailored to the content or keyword. In the example where the user is searching for information about automobiles, a message such as "Buy the latest parts for your automobile at discount prices" might be substantially more effective than a generic message "Big Box Store—we offer everything under the sun". An advertiser might also want to tailor the message even further, based on the category or keyword. For example, a user searching for information about an automobile that has not yet been placed into the market, such as next year's new hybrid vehicle, might not be interested in seeing a message about buying parts since the car is not yet available. It might be beneficial to instead display a message such as "Get the latest books and magazines about the next generation hybrids". While more narrowly tailored ads can be significantly more successful, however, the number of possible keywords, categories, and sub-categories is extremely large and there must be some decisions made as to which categories and keywords make financial sense to provide with tailored advertisements, and at what level in the subcategories does the advantage of a further tailored message no longer make sense.

Once an advertisement has been placed and a user actually clicks on or otherwise selects a sponsored link, the user is directed to a landing page specified by the advertiser through the advertising manager 212. Considering an example of an online marketplace that offers items in several different categories, a basic approach would simply direct the user to the home page, welcome page, or other such introductory display for the marketplace. It can be more effective, however, to direct the user to a page (herein referred to as a "landing page" as discussed above) offering items or displaying information related to the keyword or category for which the advertiser decided to advertise and the user was searching for information. In the example where a user was searching for information about hybrid automobiles, an address for a landing page could be selected based on the landing page displaying information about automobiles, or more advantageously hybrid automobiles. Again, however, a decision can be made about the level that makes sense for each keyword or category. Given a marketplace with thousands or even millions of items, and the fact that there can be millions of possible categories and keywords, it can be desirable to have a system that automatically and accurately selects landing pages and other options for those choices that make financial sense for an advertiser.

While some systems allow for a "generic" link that then can be redirected by the advertiser once the user follows the link and is directed to a site of the advertiser, certain search engines and other providers monitor the landing pages associated with various links for purposes of quality control, etc. A search engine provider may wish to be know exactly where a user is being directed, as a user being directed to an inappropriate page or site can result in that user developing an unfavorable view of the search engine provider. As such, search engine providers can issue quality scores or similar ratings for each advertiser based on the keyword-landing page pair, which can affect the advertiser's ability to have advertisements displayed on the results pages. Further, some search engine providers require a page to be approved before the link is accepted, and a provider might be unwilling to accept a generic link because the provider has no control over where the user is going to finally be redirected. A provider also wants to avoid displaying broken links, etc.

Thus, it can be desirable to develop algorithms for selecting landing pages based upon a variety of factors for selecting an optimal landing page at any given time. For example, if a first source has a high conversion rate for music items but a low conversion rate for clothing items, then suggestions from that source will be more highly ranked for music items than for clothing. If it is a current goal for a period of time to push clothing items for that source, however, the clothing suggestion from that source might be rated more highly. Another source might perform better selling items in certain geographical regions, at certain times of day, to certain demographics or age groups, etc. One source might be a major driver of revenue, and thus can be given a higher priority, while in other cases a new source might be given priority for a period of time in order to help build business for that source. Each source also can be given a trust rating, such as may be based on the number of conversions, complaints, etc., as well as periodic tests to determine whether suggested landing pages actually are appropriate for the suggested keyword. Any of a number of factors can be taken into consideration in order to dynamically select an optimal landing page for any given keyword or category. While it might seem desirable to select landing pages based simply on conversion rate or profit, for example, factors such as appropriateness and consumer confidence dictate that in the long run it can be advantageous to provide the user with results that are of more interest for that particular user.

Figure 3:
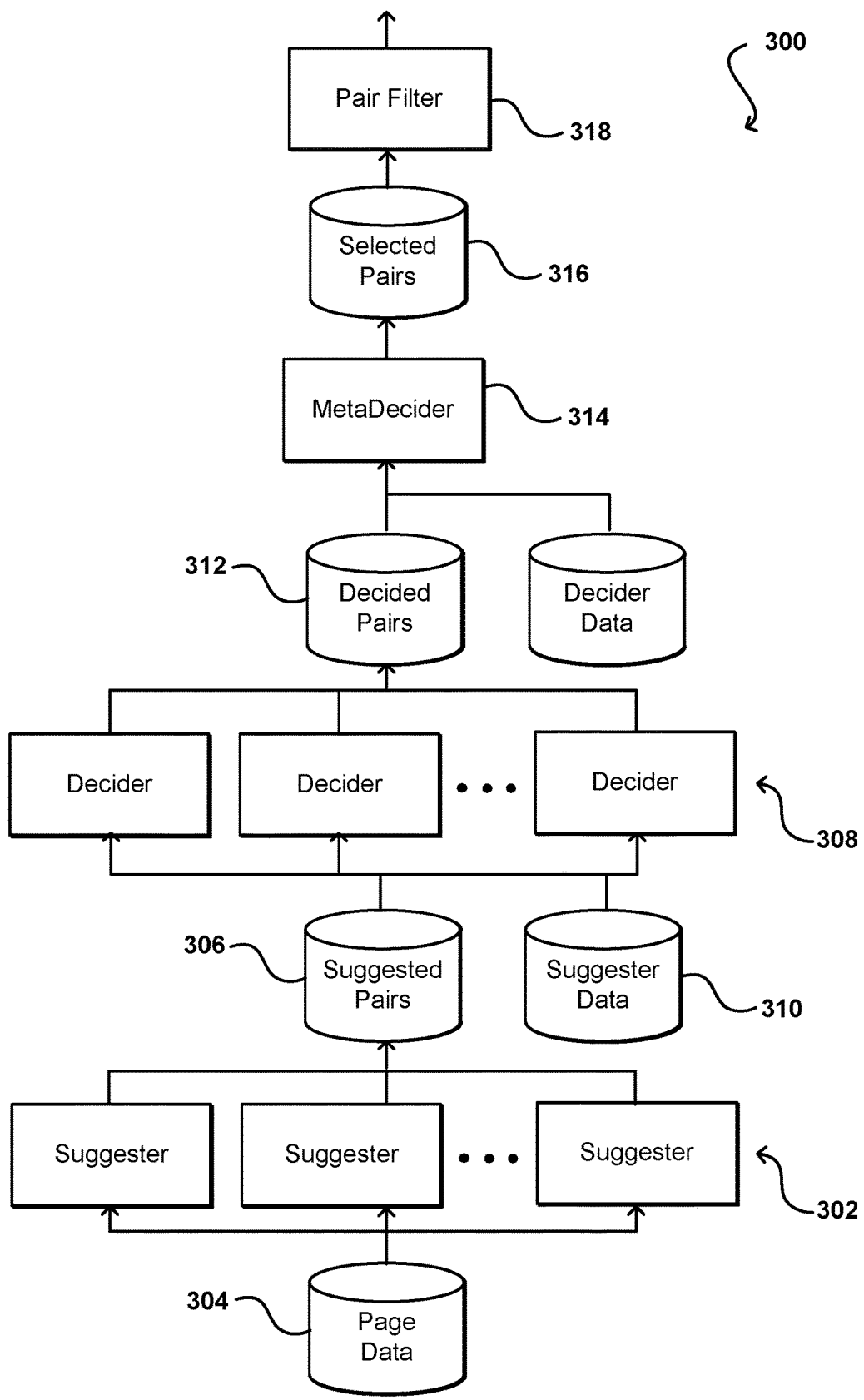
FIG. 3 illustrates components for generating and selecting keyword-landing page pairs that can be used in accordance with one embodiment.

FIG. 3 illustrates a configuration of components 300 that can be used to select an optimal landing page for a given keyword or other content in accordance with one embodiment. As will be discussed in more detail later herein, such a system can include a number of processes, applications, modules, or other such components which will collectively be referred to herein as "suggesters" 302. Each suggester can examine information from a data store 304 containing any information that can be related to, or relevant for, various pages, such as may include page content, production data, historical data, financial data, and other such information to suggest pages to be associated with a given keyword. The landing pages suggested by each suggester then can be stored to a data store 306 or other appropriate storage location. These suggestions can be stored as keyword-landing page pairs, or as any other appropriate association. The system also can include a set of processes, applications, modules, or other such components which will collectively be referred to herein as "deciders" 308. Each decider can include an algorithm or other decision process for analyzing the suggested landing pages for each keyword and making a decision as to the optimal landing page for that keyword based on the respective algorithm. Each algorithm can look to information in a data store 310 such as data relating to each suggester. For example, a decider that uses an algorithm that is based at least in part on conversion rate might only analyze suggestions from suggesters that take conversion rate into account. The decider then can process those suggestions using the algorithm to make a selection for the optimal landing page. The optimal keyword-landing page pairs from each decider then can be stored to a data store 312, the optimal result from each decider being referred to herein as a "decided" pair. As should be understood, data stores discussed herein such as the data store for storing the decided pairs can be part of any other data store discussed with respect to this figure or a separate data store.

The system in this example includes a process, application, module, or other such component which will be referred to herein as a "metadecider" 314. A metadecider 314 is able to analyze data for each decider in combination with any of a number of algorithms, goals, or other such factors, to select one of the decided keyword-landing page pairs as the optimal keyword-landing page pair at the given time. Each optimal keyword-landing page pair then can be stored to a table or data store 316 for use in updating the keyword-landing page pairs on any appropriate site, page, etc. As discussed in further detail below, since an advertiser might want to limit the number of landing page changes at any time, a pair filter 318 or similar component can be used to control the number and/or selection of keyword-landing page pairs which are actually updated at any given time. As should be apparent, any of a number of other components and/or configurations can be used as well in various embodiments, as discussed elsewhere herein.

Figure 4:
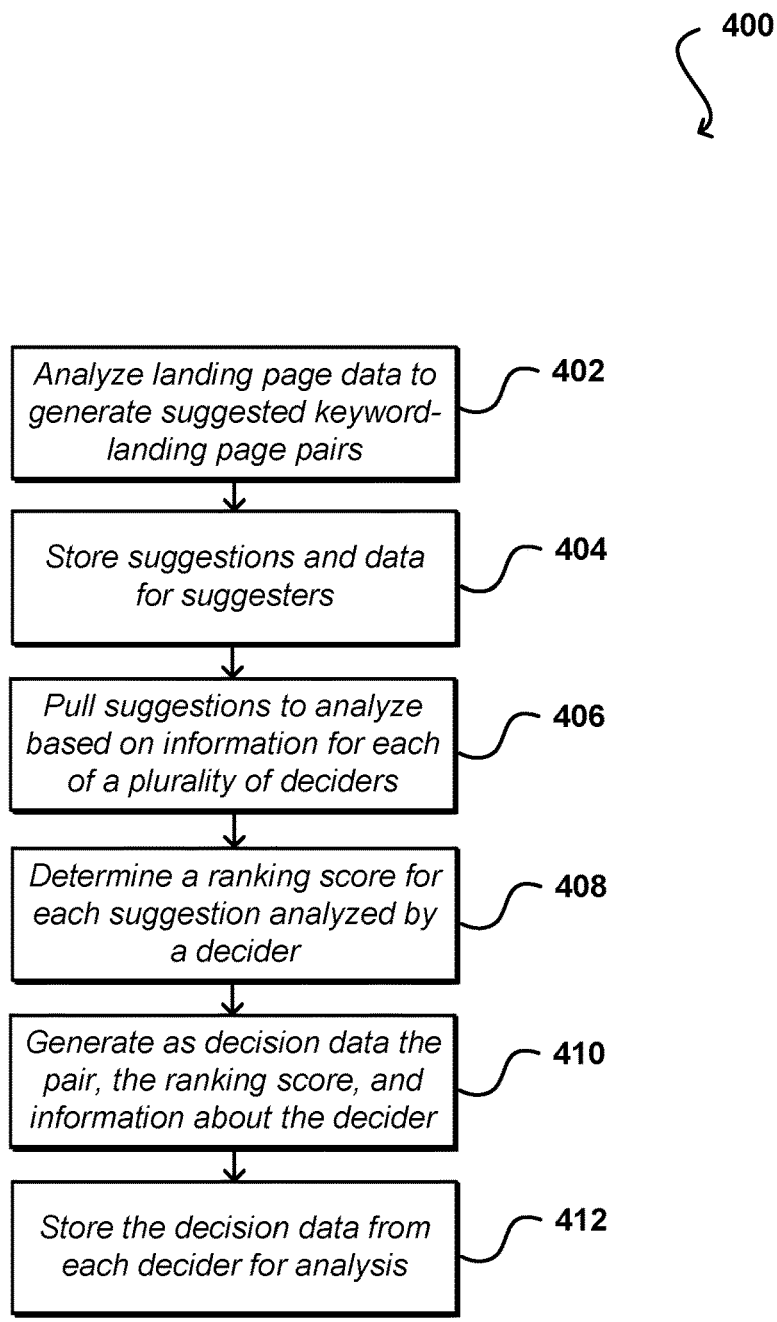
FIG. 4 illustrates steps of a method for deciding among suggested keyword-landing page pairs that can be used in accordance with one embodiment.
Figure 5:
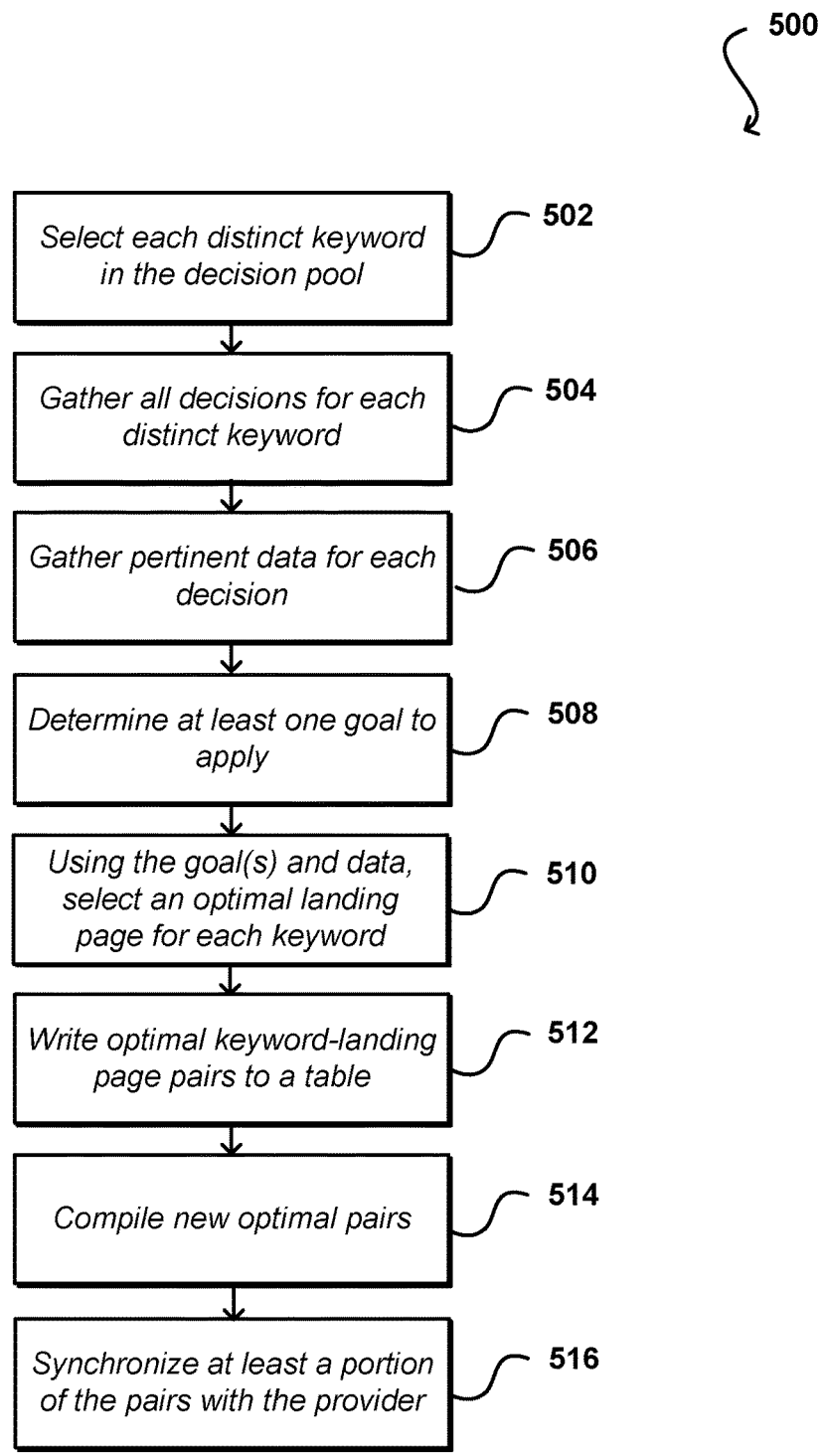
FIG. 5 illustrates steps of a method for deciding on an optimal landing page to pair with a keyword based upon selections of a deciding process such as that of FIG. 4.

FIGS. 4 and 5 illustrate portions of an example process 400, 500 for selecting optimal keyword-landing page pairs that can be used with a system such as that described with respect to FIG. 3. As mentioned, at least one suggester can analyze various information to suggest potential keyword-landing page pairs 402. A goal of such a process can be to ensure that the process can be as simple as possible. Suggestions in one embodiment can be placed into the system without any care as to how each suggestion affects current business goals, addresses current trends, or are otherwise limited by any particular factor that can change over time. Such an approach not only allows for suggestions that might not get selected at the present time but might be selected in the future as times or goals change, but also allows suggestions to be considered that do not include any "value add" data that can be used to determine the strength of the suggestion. Such an approach also helps the system to learn how much to trust, or how highly to rate, a given suggester.

One way that suggesters can determine suggested keyword-landing page pairs is by looking at internal search feeds for the advertiser. For example, a user might submit a keyword from a home page and another user might submit the same keyword from a search page for a specific category. When the user receives results from the search, the user will often select at least one page to view. The pages used to initiate the search, the results pages displayed as a result of the search, and each individual item page viewed by the user can each be potential display pages to be associated with the keyword. Another suggester might look at items actually purchased as a result of searching by a particular keyword. Another suggester might look at the categories which are most viewed for a particular keyword. Another suggester might look to the text actually included in a page. For example, if an item actually includes the keyword in a description or name of the item, then the page for that item might be suggested as a display page.

A suggester might also attempt to make more intelligent decisions. For example, a user viewing search results for a keyword might navigate to a series of pages. If the user actually purchases an item from one of those pages, then the landing page for that item can be more appropriate or at least desirable for the advertiser to pair with the keyword submitted by the user. A suggester thus can look to factors such as advertising revenue and conversion rates. If the landing page relates to an item offered from a source, then the suggester can look to information such as a rating of that source, historical data for that source or item, etc. For example, in an electronic marketplace there might be several sellers, departments, etc., offering items in a given category, and each might suggest a landing page for the category. Each source could submit a keyword-landing page pair, wherein the source suggests that a particular landing page be used when advertising for that keyword. In such a case, a suggester can look at factors such as the current revenue or conversions of each source, the page views for each source, etc., and then select the landing page based on those factors.

Once each suggester determines at least one suggested landing page for a keyword, each keyword-landing page pair can be pooled or otherwise stored to a table or other appropriate location in a way that the pair is associated with the suggester 404. In this way, information about the respective suggester can be used in determining how to rate or otherwise analyze each suggestion.

Once the suggesters have finished selecting possible display pages to be associated with specific keywords, etc., the suggestions can each be analyzed by a set of deciders in order to attempt to score or rate the suggestions. Each decider can examine the pool of suggestions from the suggesters, and can pull suggestions based on the factors used for that decider 406. For example, if a decider includes an algorithm that ranks based on conversion rate, then the decider might only pull suggestions from suggesters that take conversion rate into account. If a suggester does not have access to conversion rate data, then the decider might ignore any suggestions from that suggester. For suggesters that have access to conversion rate data, the decider might ask for the conversion rate data for the suggested landing page and use that data to consider and rank the suggestion. Each decider then can make decisions about which suggestions to consider based on whether certain types of data are available for those suggestions. Such data can include, for example, absolute conversion, conversion rate, units sold, conversion profit, etc. In some cases, the system can be configurable to always consider suggestions from specific suggesters for certain categories, never consider suggestions for certain categories, etc.

Each decider can be a process or module, for example, that accepts as input a suggestion and, in one embodiment, outputs a keyword, a landing page, and a score, from here on this will be referred to as a "decision." Decisions in other embodiments can include additional or different information, and may only be output for suggestions meeting a minimum scoring criterion. As each decider may utilize a different scoring model and/or algorithm, it can be difficult to correlate scores across different deciders. It is a goal of the set of deciders in one embodiment to determine which landing page each decider prefers, and/or the relative score of the top set of pages. The decisions then can be subsequently analyzed using various business goals under various situations.

Each decider can have access to a data store or other repository storing information in addition to the set of suggested keyword-landing page pairs from various suggesters. A decider in one embodiment does not have any information as to how each suggester arrived at the decision to suggest a landing page, but instead has the suggestion and information about the suggester. The decider can utilize at least one ranking algorithm to analyze data for each suggester relative to the category, sub-category, keyword, etc., and to generate a ranking or other such score for each suggestion from a suggester 408. Each decider then can select or "decide" upon an optimal landing page based on the suggester with the highest ranking under those parameters. An algorithm can look at information such as conversion data for each suggester for a category, whether the suggested page is a page of search results or items for a category or a specific detail page for a particular item, etc. Each decider can use a different algorithm, and can thus arrive at the same or different selected keyword-landing page pairs as other deciders. For each analyzed suggestion, a decider can output decision information such as may include the keyword, information for the suggested landing page, a decision score, and an identifier for the decider making the decision 410. The results of each decider then can be ranked and grouped or "bucketized" by the decider. The results of the various deciders then can be stored to a table or data store as a set of decisions 412.

The set of decisions can be analyzed using another decision process or component, hereinafter referred to as a "metadecider." The metadecider operates as a second level of decision logic, providing for more dynamic and optimal decisions than previous systems. FIG. 5 illustrates the portion 500 of an example process for analyzing the initial decisions from the deciders in accordance with one embodiment. A metadecider in accordance with one embodiment analyzes the pool of decisions, or keyword-landing page pairs selected by the various deciders, and further analyzes information such as the landing pages, the decider for each landing page, and any goal for the category. The metadecider can analyze performance data for each decider that relates to the goal using an appropriate algorithm, and can select the final keyword-landing page pair to be used, such as may be based upon the pair with the highest score as a result of the metadecider algorithm.

For example, a metadecider in accordance with one embodiment can analyze all distinct keywords in a decision pool 502. As it is desirable to continually update the appropriate landing page, the algorithm can continually loop over these keywords. For each unique keyword, the algorithm can gather all decisions for that keyword from the various deciders 504. The algorithm can also gather all pertinent data, such as a categorization of each landing page corresponding to a decision, financial information for each landing page associated with the keyword over at least a period of time, and financial numbers for each decider for each category that is under consideration for the advertisement 506. The metadecider algorithm can accept as input at least one current goal for a category, advertiser, etc., and from the data can decide the appropriate goal(s) to which to optimize the display page 508. The metadecider algorithm then attempts to select the optimal landing page by analyzing the scores for the decision from each decider 510. In some embodiments, financial numbers for this landing page categorization can be fed into the percentage weighted goals and the outputs summed together. After all deciders are run through in this manner, the decision having the highest final value can be selected as the final keyword-landing page pair.

As discussed, there can be various business goals or campaigns that change over time. For example, an electronic marketplace might decide to advertise books more during the fall and winter than in the summer, and might decide to spend more money advertising toys during the holiday season. Also, an advertiser might decide to spend money advertising child-friendly products during the day and more adult products at night.

In one approach, at least one goal is selected to be used in determining which landing page to use for a given keyword or category. Each source suggesting a landing page then can be evaluated with respect to the selected goal(s). For example, a keyword might relate to items that are 70% in a book category and 30 percent in a video category. Each of these categories might have different and/or competing goals. The goals can then be weighted accordingly. For example, if source A is slightly better in books than source B, and source B is much slightly better than source A in video, then the suggestion of source A might still be selected based on the relative weighting of the respective goals. Goals in one embodiment are selected by a category manager. The category manager might not care what landing pages are actually displayed, as long as the pages are appropriate, but may simply wish to increase revenue if that is part of the goal. If the goal is instead to increase awareness of a category of items, then the goal might be to spend more advertising revenue and select landing pages that are directed to that category of items. Another goal could be to spend advertising money only for products with a minimum price or profit. In such an approach, the goal(s) can be relatively static, but the performance data associated with that goal is dynamic such that the landing pages selected can change along with the performance data. Also, item data might change such that the suggested landing page changes for a given goal. For example, for a given electronics product there can be competing pages for this year's product and next year's product. The landing page for the current product might win for a while, but at some point the landing page should switch to the new model, even if the goal and the source ratings do not change.

Once the final keyword-landing page pair is decided for a given keyword, the system in one embodiment writes the information to a table that includes information for all active keyword-landing page pairs 512. A process, which can involve a pair filter as discussed above, can periodically examine the entire table to determine any changes, and can compile any changes into a format for each provider or vendor to receive the pairs 514, and then can synchronize the pairs with the information at the vendor or provider 516. In some cases, the table may contain different keyword-landing page pairs for different vendors, and the process can pull the appropriate information for each vendor. In one embodiment, the data is compiled in an extensible markup language (XML) document and passed to the vendor via a Web services call using a protocol such as the simple object access protocol (SOAP).

A submission of updated keyword-landing page pairs can be done in batches, such as via Web services calls, with other keyword-landing page pairs in order to reduce traffic, resources, submission charges, etc. The submission, or a separate submission, also can include information for the keyword-landing page pair, such as the text, graphics, audio, and/or video to display with the advertisement, how much to bid, a bidding schedule, etc.

While it can be desirable to dynamically update the landing pages as much as possible, this can be undesirable in certain situations. For example, each search engine or other provider might charge for the number of changes, calls, or requests, such that it can be desirable to only send a maximum number of changes or requests. Further, it can be desirable to limit the number of changes at any given time to minimize the exposure due to any glitch in the process. As an extreme example, a software glitch might cause a metadecider to inadvertently select the same landing page for each keyword, or delete all landing page pairs. In a more common example, a decider might be introduced that is generating poor decisions that are not being caught right away. In order to minimize the effects of any such glitch, a filtering system can be used to limit the number of changes, such as to a maximum or 10% of the total keyword-landing page pairs, and then filter the desired changes such that only a certain amount can take effect at any time. Such a limit also prevents any such glitch from rapidly damaging a performance rating, etc.

A system in accordance with one embodiment provides a framework wherein new deciders and algorithms can be introduced and tested along with the other deciders. Since new deciders do not have any associated performance or other data, however, a metadecider might seldom select a decision from a new decider. A system in accordance with one embodiment addresses this issue by weighting new metadeciders more highly, or allowing a certain percentage of decisions to be made by new deciders, in order for each new decider to gain a level of performance information. Once enough information is obtained for a new decider, the decider can be treated as any other decider and the selections will be based on performance. In this way, new deciders that provide useful suggestions will result in several selections being used, while new deciders with less useful suggestions will result in few to no suggestions, and then can be removed from the system. In another embodiment, data for a new decider is accrued whenever the new decider generates a suggestion that is the same as another decider. In such a case, the data can be gathered for both deciders, and eventually the new decider will have a sufficient amount of performance data. Such an approach allows any new decider or algorithm to simply be added to the system and tested out, and the system will self-adjust and determine itself whether the decider is useful or not, without significantly impacting the decisions.

There also can be similar issues for new landing pages. As discussed, there can be many different types of information associated with any given keyword, for certain keywords the suggesters, deciders, and/or metadecider can look at historical information to assist in determining the best landing page for a keyword. For example, if users searching for information about a superhero into a search engine most often buy comic books, then an algorithm for at least one of the decision levels can rank comic book display pages higher than other pages. If there is not enough historical data to assist with such a decision, then a landing page can be selected using the algorithms and source information until there is enough historical data to weight the various types of display pages. Such an approach also helps page selection to update dynamically, as when users for a keyword move to purchasing different items, then the weighting of pages can change accordingly based upon that data. For example, users might still be directed to pages for comic books, but might more often navigate to downloadable video content. This information can be stored in the system and used to weight pages for downloadable content more highly than pages for comic books. If, however, the users linked to downloadable content for some reason do not have as high a conversion rate, then a different weighting can be used or the decision from a decider taking conversion into account can be selected.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   determining landing pages associated with a keyword, the keyword corresponding to a term used in a search request on a search page for an item;
   determining an identity associated with the search request;
   analyzing individual landing pages of the landing pages using different scalable algorithms for processing multiple decisions, each scalable algorithm processing a decision of the multiple decisions that is associated with an individual landing page and at least one goal for a category of the individual landing page to generate a ranking score for the individual landing page;
   selecting, based on the ranking scores and the identity of the search request, an optimal landing page from the landing pages;
   associating a sponsored link with the keyword; and
   displaying the sponsored link on a display screen of a computing device, the sponsored link enabling, in response to being selected, navigation from the search page to the optimal landing page.

2. The method according to claim 1, further comprising:
   selecting an advertisement for an advertiser from a plurality of potential advertisements for that advertiser based on the keyword.

3. The method according to claim 2, further comprising:
   associating a weight with each of the plurality of potential advertisements based at least in part on the advertiser.

4. The method according to claim 2, further comprising:
   associating a weight with the plurality of potential advertisements based at least in part on a product category for the item.

5. The method according to claim 1, wherein the at least one goal is one or more of: a time of day; a time of week; a time of year; a conversion rate or profit for the item, an appropriateness measure for the item, and consumer confidence measure for the item as dictated by the identity of the search request.

6. The method according to claim 1, wherein the identity of the search request is a user identity of the user submitting the search request.

7. The method according to claim 6, further comprising:
   accessing a catalog detail information to obtain information for the item based on the user identity; and
   selecting, based on at least the catalog detail information, the optimal landing page from the selected landing pages.

8. The method according to claim 1, further comprising:
   displaying, via a web-based display, the sponsored link allowing the user to navigate to the optimal landing page, wherein the optimal landing page comprises results listing with a dedicated page or window for the item.

9. A system, comprising:
   a processor; and
   a memory device including instructions that, when executed by the processor, enable the system to:
   determine landing pages corresponding to a keyword, the keyword corresponding to a search request for an item;
   determine an identity associated with the search request;
   analyze individual landing pages of the landing pages using different scalable algorithms for processing multiple decisions, each scalable algorithm processing a decision of the multiple decisions that is associated with an individual landing page and at least one goal for a category of the individual landing page to generate a ranking score for the individual landing page;
   select, based on the ranking scores and the identity of the search request, an optimal landing page from the landing pages; and
   associate a sponsored link with the keyword, wherein a user submitting the search request receives, for display in response to the search request, the sponsored link enabling the user to navigate to the optimal landing page.

10. The system according to claim 9, wherein the memory device further includes instructions that, when executed by the processor, enable the system to:
    select an advertisement for an advertiser from a plurality of potential advertisements for that advertiser based on the keyword.

11. The system according to claim 10, wherein the memory device further includes instructions that, when executed by the processor, enable the system to:
    associate a weight with each of the plurality of potential advertisements based at least in part on the advertiser.

12. The system according to claim 10, wherein the memory device further includes instructions that, when executed by the processor, enable the system to:
    associate a weight with the plurality of potential advertisements based at least in part on a product category for the item.

13. The system according to claim 9, wherein the at least one goal is one or more of a time of day; a time of week; a time of year; a conversion rate or profit for the item; an appropriateness measure for the item; and a consumer confidence measure for the item as dictated by the identity of the search request.

14. The system according to claim 9, wherein the identity of the search request is a user identity of the user submitting the search request.

15. The system according to claim 9, wherein the identity of the search request is a user identity of a user device submitting the search request.

16. A non-transitory computer-readable medium including instructions that, upon being executed by a processor of a computing device, cause the computing device to:
    determine landing pages corresponding to a keyword, the keyword corresponding to a search request for an item;
    determine an identity associated with the search request;
    analyze an individual landing pages of the plurality of landing pages using different scalable algorithms for processing multiple decisions, each scalable algorithm processing a decision of the multiple decisions that is associated with an individual landing page and at least one goal for a category of the individual landing page to generate a ranking score for the individual landing page;

select, based on the ranking scores and the identity of the search request, an optimal landing page from the landing pages; and associate a sponsored link with the keyword, wherein a user submitting the search request receives, for display in response to the search request, the sponsored link enabling the user to navigate to the optimal landing page.

17. The non-transitory computer-readable medium of claim 16, wherein the identity of the search request is a user identity of the user submitting the search request.

18. The non-transitory computer-readable medium of claim 16, wherein the identity of the search request is a user identity of a user device submitting the search request.

19. The non-transitory computer-readable medium of claim 17, wherein the instructions when executed further cause the computing device to:

access a catalog detail information to obtain information for the item based on the user identity; and select, based on at least the catalog detail information, the optimal landing page from the selected landing pages.

20. The non-transitory computer-readable medium of claim 16, wherein the instructions when executed further cause the computing device to:

display, via a web-based display, the sponsored link allowing the user to navigate to the optimal landing page, wherein the optimal landing page comprises results listing with a dedicated page or window for the item.

* * * * *